US009558483B2

(12) United States Patent
Gupta et al.

(10) Patent No.: US 9,558,483 B2
(45) Date of Patent: Jan. 31, 2017

(54) SYSTEMS AND METHODS FOR TRANSFERRING VALUE TO PAYMENT ACCOUNTS

(71) Applicant: MASTERCARD INTERNATIONAL INCORPORATED, Purchase, NY (US)

(72) Inventors: Akshat Gupta, Vernon, CT (US); Ryan Bodman, Louisville, KY (US); Ricardo Pareja, São Paulo (BR); Stephen Parento, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/595,696

(22) Filed: Jan. 13, 2015

(65) Prior Publication Data

US 2016/0071075 A1 Mar. 10, 2016

Related U.S. Application Data

(63) Continuation-in-part of application No. 14/479,941, filed on Sep. 8, 2014.

(51) Int. Cl.

| | |
|---|---|
| ***G06Q 20/10*** | (2012.01) |
| ***G06Q 20/28*** | (2012.01) |
| ***G06Q 20/32*** | (2012.01) |
| ***G06Q 20/36*** | (2012.01) |

(52) U.S. Cl.

CPC ............ *G06Q 20/28* (2013.01); *G06Q 20/322* (2013.01); *G06Q 20/3672* (2013.01)

(58) Field of Classification Search

CPC ...................................................... G06Q 40/00

USPC ....... 235/380, 449; 705/14.35, 14.17, 17, 35

See application file for complete search history.

(56) References Cited

U.S. PATENT DOCUMENTS

| | | | | |
|---|---|---|---|---|
| 2006/0004656 A1* | 1/2006 | Lee | G06Q 20/04 705/39 |
| 2006/0167780 A1* | 7/2006 | Friedman | G06Q 40/00 705/35 |
| 2007/0078710 A1* | 4/2007 | Bender, II | G06Q 30/02 705/14.17 |
| 2007/0288313 A1 | 12/2007 | Brodson et al. | |

(Continued)

OTHER PUBLICATIONS www.paysafecard.com/en-us/products/paysafecard; Jan. 14, 2015; 2 pgs.

www.ukash.com/en-zz/about-ukash; accessed Jan. 14, 2015; 1 pg.

*Primary Examiner* — Allyson Trail

(74) *Attorney, Agent, or Firm* — Harness, Dickey & Pierce P.L.C.

(57) ABSTRACT

Systems and methods are provided for transferring value from to a payment account associated with a virtual wallet of a consumer. The value can be transferred using voucher-based transactions or cash-based transactions. One exemplary method includes receiving, at a computing device, a load request to transfer value to a payment account associated with a consumer. The load request includes the value to be transferred and a directory number for a mobile device associated with the consumer. The method also includes determining an account number for the consumer's payment account, at the computing device, based on the directory number for the consumer's mobile device and generating, by the computing device, a request indicating the value to transfer to the payment account and the account number for the consumer's payment account.

19 Claims, 3 Drawing Sheets

CONVERSION ENGINE 112
122
200
100
106
108
ACQUIRER
PAYMENT NETWORK
VALUE TRANSFER PROVIDER
102
110
ISSUER
104
VOUCHER PROVIDER
NETWORK
MERCHANT
114
116
118
120
CONSUMER

(56) References Cited

U.S. PATENT DOCUMENTS

| | | | | |
|---|---|---|---|---|
| 2008/0046366 | A1* | 2/2008 | Bemmel | G06Q 20/20 705/44 |
| 2008/0167017 | A1* | 7/2008 | Wentker | G06Q 20/10 455/414.1 |
| 2008/0249928 | A1* | 10/2008 | Hill | G06Q 20/04 705/39 |
| 2008/0257958 | A1 | 10/2008 | Rothwell et al. | |
| 2010/0042538 | A1* | 2/2010 | Dheer | G06Q 20/10 705/40 |
| 2011/0295750 | A1 | 12/2011 | Rammal | |
| 2011/0320358 | A1* | 12/2011 | Harris | G06Q 40/00 705/45 |
| 2013/0018785 | A1* | 1/2013 | Dolphin | G06Q 20/10 705/40 |
| 2013/0036048 | A1* | 2/2013 | Campos | G06Q 20/36 705/41 |
| 2013/0132217 | A1* | 5/2013 | Yahn | G07F 17/26 705/17 |
| 2013/0144738 | A1 | 6/2013 | Qawami et al. | |
| 2013/0317926 | A1 | 11/2013 | Leeds et al. | |
| 2014/0067565 | A1 | 3/2014 | Brown | |
| 2014/0081839 | A1 | 3/2014 | Blackhurst et al. | |
| 2014/0136351 | A1* | 5/2014 | Lennon | G06Q 20/12 705/18 |
| 2014/0222591 | A1 | 8/2014 | Baradoy et al. | |
| 2014/0358779 | A1* | 12/2014 | El-Sakka | G06Q 20/16 705/44 |
| 2014/0372301 | A1 | 12/2014 | Anamanamuri | |
| 2015/0262160 | A1* | 9/2015 | Hursta | G06Q 20/227 705/14.51 |

* cited by examiner

SYSTEMS AND METHODS FOR TRANSFERRING VALUE TO PAYMENT ACCOUNTS

CROSS-REFERENCE TO RELATED APPLICATION

This application is a continuation-in-part of U.S. patent application Ser. No. 14/479,941, filed on Sep. 8, 2014, the entire disclosure of which is incorporated herein by reference.

FIELD

The present disclosure generally relates to systems and methods for transferring value to payment accounts such as those, for example, associated with virtual wallets, etc., using cash, vouchers, etc.

BACKGROUND

This section provides background information related to the present disclosure which is not necessarily prior art.

Virtual wallets (e.g., mobile wallets, etc.) are used by consumers in transactions with merchants to purchase goods and services. Often, the consumers load predetermined monetary values to accounts associated with the virtual wallets, and then later use the values in transactions with the merchants. When the monetary values in the accounts are depleted, the consumers reload them prior to further use. Separately, vouchers and cash are often used by consumers in payment transactions to purchase goods or services from the merchants.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The description and specific examples included herein are intended for purposes of illustration only and are not intended to limit the scope of the present disclosure.

Virtual wallets are used by consumers in payment transactions with merchants. Prior to initiating the payment transactions, monetary value is typically loaded (or transferred) to accounts associated with the virtual wallets to fund the transactions. The systems and methods herein allow the consumers to load the value to the accounts based on directory numbers (e.g., phone numbers, etc.) for mobile devices associated with the consumers and linked to their accounts. The monetary value loaded to the accounts can then be used, through the virtual wallets, to complete payment transactions with the merchants.

Figure 1:
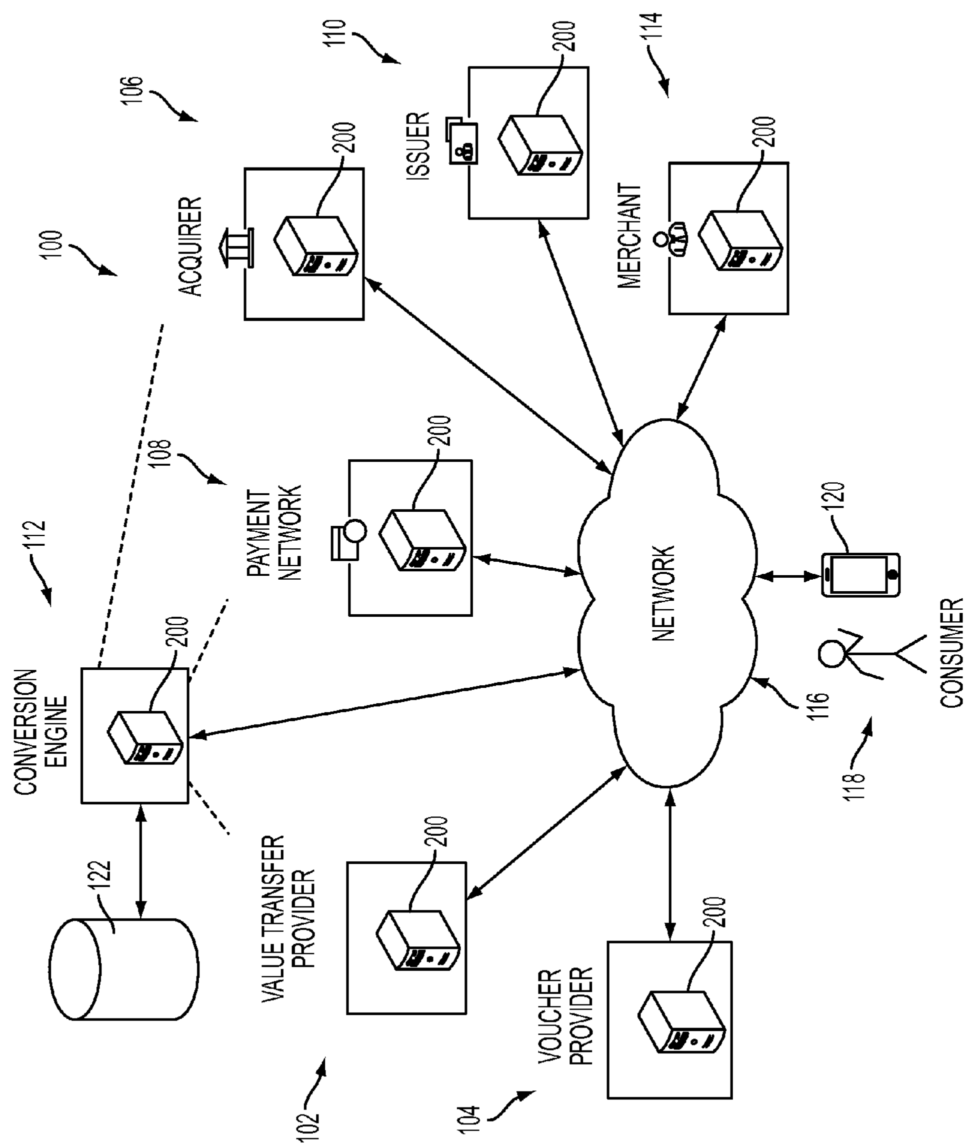
FIG. 1 is a block diagram of an exemplary system of the present disclosure suitable for use in transferring value to a payment account associated with a virtual wallet.

With reference now to the drawings, FIG. 1 illustrates an exemplary system 100, in which one or more aspects of the present disclosure may be implemented. Although components of the system 100 are presented in one arrangement, it should be appreciated that other exemplary embodiments may include the same or different components arranged otherwise, for example, depending on associations between various entities of the system 100, etc.

The illustrated system 100 generally includes a value transfer provider 102, a voucher provider 104 (which may also be a merchant), an acquirer 106, a payment network 108, an issuer 110, a conversion engine 112, and a merchant 114 (which may also be a voucher provider), each coupled to network 116. The network 116 may include, without limitation, a wired and/or wireless network, one or more local area network (LAN), wide area network (WAN) (e.g., the Internet, etc.), other network as described herein, and/or other suitable public and/or private network capable of supporting communication among two or more of the illustrated components, or any combination thereof. In one example, the network 116 includes multiple networks, where different ones of the multiple networks are accessible to different ones of the illustrated components in FIG. 1.

Generally, in the system 100, a consumer 118 has a virtual wallet associated with a payment account issued by the issuer 110. Upon use of the mobile wallet to perform a payment transaction, via a mobile device 120 associated with the consumer 118 (e.g., at the merchant 114, at another merchant, etc.), the value of the transaction is deducted from the payment account. In the illustrated embodiment, the virtual wallet is a mobile pre-paid wallet requiring value (e.g., cash, credits, etc.) to be present in the associated payment account prior to use of the virtual wallet. When the value in the payment account is depleted, the consumer 118 must reload the account prior to further use (i.e., a line of credit is not associated with the virtual wallet in the illustrated embodiment). With that said, the mobile device 120 may include any suitable mobile device such as, for example, a mobile phone, a tablet computer, etc. In other exemplary embodiments, virtual wallets may be associated with lines of credit. In these embodiments, funds transferred to accounts associated with the virtual wallets can then be used as payments against the lines of credits.

To provide value to the payment account associated with the virtual wallet (e.g., to load, reload, etc. the payment account, etc.), prior to use of the wallet in a transaction with the merchant 114, the consumer 118 can utilize either voucher-based transactions or cash-based transactions (reload fees may or may not be charged, for example, by the voucher provider 104 or merchant 114).

As shown in FIG. 1, in connection with a voucher-based transaction, the consumer 118 purchases a voucher, from the merchant 114 (or from another source), with a desired value to be placed in the payment account. The voucher is initially provided to the merchant 114 by the voucher provider 104, and may or may not be associated with the issuer 110 of the consumer's payment account (e.g., the voucher can be an open-loop voucher or a closed-loop voucher, etc.). The merchant 114 collects funds (e.g. cash, etc.) from the consumer 118 corresponding to the value of the voucher, and communicates to the voucher provider 104, via the network 116, a voucher identification number (VID) for the purchased voucher and the value of the voucher. Using this data, the voucher provider 104 activates the voucher in the desired value (e.g., in a data structure associated with the voucher provider 104, etc.), and communicates, via the network 116, an activation confirmation back to the merchant 114. The merchant 114 then provides a voucher activation receipt to the consumer 118, indicating the VID and the voucher value, for the purchased voucher.

To transfer the value of the voucher (in total or in part) to the payment account associated with the consumer's virtual wallet, the consumer 118 submits a request (e.g., a transfer request, a load request, etc.) to the value transfer provider 102. In so doing, the consumer 118 identifies the VID (and/or provides other data to identify the purchased voucher and the value associated therewith) and a directory number (e.g., a phone number such as a MSISDN, etc.) for the consumer's mobile device 120.

As part of the system 100, the value transfer provider 102 may include a website accessible to the consumer 118, via the network 116, to facilitate the value transfer. Upon accessing the website, various interfaces may be displayed for use by the consumer 118 to enter the VID and the directory number for the consumer's mobile device 120. Alternatively, the value transfer provider 102 may be associated with a particular phone number (and, in some aspects, may also include an interactive voice response (IVR) system, etc.). The consumer 118 may then call or text the particular phone number and provide the VID and the directory number to the value transfer provider 102 (or the value transfer provider 102 may automatically recognize the consumer's directory number, based on the mobile device 120 from which the call is being sent).

After receiving the request from the consumer 118, the value transfer provider 102 confirms the validity and/or the value of the voucher identified by the consumer 118, before further processing the consumer's request. As an example, the value transfer provider 102 may communicate data relating to the voucher (as received from the consumer 118) to the voucher provider 104, via the network 116, for verification. If the voucher data is valid, the voucher provider 104 may then communicate a confirmation back to the value transfer provider 102. Alternatively, if the voucher data is invalid (e.g., the VID is invalid, the voucher value is invalid, etc.), the voucher provider 104 may then communicate a warning back to the value transfer provider 102 (and, in some embodiments, may flag the voucher as invalid, etc.).

Also after receiving the request from the consumer 118, the value transfer provider 102 communicates a request (e.g., a conversion request, etc.) to the conversion engine 112, via the network 116, for the account number of the consumer's payment account (e.g., via an application programming interface (API) associated with the conversion engine 112, etc.). In particular, the value transfer provider 102 communicates the consumer's directory number to the conversion engine 112, as part of the request, and the conversion engine 112 then maps or identifies (e.g., via account number mapping, etc.) the account number of the consumer's payment account based on the directory number. For example, in the illustrated embodiment, the conversion engine 112 includes a data structure 122 comprising directory numbers for mobile devices for multiple consumers and corresponding account numbers for payment accounts for the consumers, with each consumer directory number associated with the consumer's corresponding account number. Using the data structure 122, the conversion engine 112 can identify the requested account number, based on the consumer's directory number, and communicate it back to the value transfer provider 102, via the network 116.

Next, the value transfer provider 102 generates a transaction request and communicates it, via the network 116, to the acquirer 106 for the voucher value. In this implementation, the acquirer 106 is associated with the value transfer provider 102. And, the transaction request includes the account number for the consumer's payment account and the value to be transferred to the payment account from the voucher. In turn, the acquirer 106 communicates the transaction request through the payment network 108 to the issuer 110 (e.g., through a credit card payment system using the MasterCard® interchange, etc.). The issuer 110 then processes the transaction request and, if valid (e.g., if the VID and the voucher value match data generated by the voucher provider 104 when the voucher was purchased, etc.), approves the request and transfers the voucher value to the consumer's payment account. The issuer 110 then communicates an authorization response, containing the updated value balance of the payment account, back to the value transfer provider 102 (again through the payment network 108 and the acquirer 106). And, when the authorization response is received, the value transfer provider 102 confirms, to the consumer 118, that the voucher value has been transferred to the consumer's payment account.

As also shown in FIG. 1, in connection with a cash-based transaction for providing value to the consumer's payment account, the consumer 118 initially contacts the merchant 114 (e.g., in person) with a request (e.g., a transfer request, a transaction request, etc.) to provide value to his/her account. The merchant 114 collects the desired value, from the consumer 118, to be provided to the payment account, in the form of a cash payment, and enters the value into a point of sale (POS) terminal. The merchant 114 also enters the directory number for the consumer's mobile device 120 into the POS terminal, for use in identifying the consumer's payment account. The merchant 114 then communicates, via the POS terminal, the request to the acquirer 106 for the transfer. In this implementation of the system 100, the acquirer 106 is associated with the merchant 114. And, the request includes the consumer's directory number and the value to be transferred to the consumer's payment account.

In one implementation of the cash-based transaction, after receiving the request from the merchant 114, the acquirer 106 transmits the request, via the network 116, to the value transfer provider 102. For example, the acquirer 106 may directly contact (e.g., call, text, etc.) the value transfer provider 102 via the value transfer provider's website or via an API associated with the value transfer provider 102 to communicate the request. Or, the acquirer 106 may transmit the request to the value transfer provider 102 via the payment network 108, through an ISO 8583 message, etc. When the transfer request is received, the value transfer provider 102 communicates a conversion request to the conversion engine 112, via the network 116, for the account number of the consumer's payment account. In particular (and as previously described), the value transfer provider 102 communicates the consumer's directory number to the conversion engine 112, as part of the request, and the conversion engine 112 then maps or identifies, in the data structure 122, the account number of the consumer's payment account based on the directory number. The conversion engine 112 then communicates the identified account number back to the value transfer provider 102, via the network 116.

In another implementation of the cash-based transaction, after receiving the request from the merchant 114, the acquirer 106 communicates the conversion request to the conversion engine 112, via the network 116, for the account number of the consumer's payment account. In similar fashion to that previously described, the acquirer 106 communicates the directory number to the conversion engine 112, as part of the request, and the conversion engine 112 then identifies (or maps) the account number of the consumer's payment account based on the directory number. The conversion engine 112 then communicates the identified account number back to the acquirer 106, via the network 116. And, the acquirer 106 then submits the request to the value transfer provider 102, via the network 116, now including the account number for the consumer's payment account and the value to be transferred to the account.

In connection with either of the above implementations of the cash-based transactions, the value transfer provider 102 next generates a transaction request (based on the consumer's request received from the acquirer 106) and communicates it through the payment network 108 (e.g., via the acquirer 106, etc.) to the issuer 110 (e.g., through the credit card payment system using the MasterCard® interchange, etc.). The transaction request includes the account number for the consumer's payment account and the value to be transferred to the consumer's payment account. The issuer 110 then processes the transaction request and, if valid (e.g., if the payment account is valid, etc.), approves the request and transfers the desired value to the consumer's payment account. The issuer 110 then communicates an authorization response, containing the updated value balance of the payment account, back to the merchant 114, again through the payment network 108 and the acquirer 106. And, when the authorization response is received, the merchant 114 confirms, to the consumer 118 (e.g., via the POS terminal, etc.), that the value has been transferred to the consumer's payment account and provides the consumer 118 with a receipt indicating the transaction details (e.g., the value amount provided to the consumer's payment account, the payment account balance, etc.).

Once value is provided to the payment account associated with the virtual wallet (by either the voucher-based transaction or the cash-based transaction), the virtual wallet (via the mobile device 120, etc.) can be used in a payment transaction, for example, as follows. The consumer 118 presents the mobile device 120 to the merchant 114 (or another merchant). In response, the merchant 114 reads the account number for the consumer's payment account from the mobile device 120 (and, in some cases, requests a personal identification number (PIN) to authorize the transaction) and communicates, via the network 116, an authorization request, including details of the transaction, to the payment network 108 (via the acquirer 106) (e.g., using the MasterCard® interchange, etc.). The payment network 108 submits the authorization request to the issuer 110. The issuer 110 then provides a response to the authorization request (e.g., authorizing or rejecting the request) to the payment network 108, and the response is provided back through the acquirer 106 to the merchant 114. The transaction is then completed, by the merchant 114, if the response includes an approval. If approved, the merchant 114 next communicates to the payment network 108 (via the acquirer 106) a clearing request for payment from the issuer 110. The payment network 108, in turn, communicates the clearing request to the issuer 110, and funds are then transferred to the acquirer 106 for clearing with the merchant 114.

While a single consumer 118 is shown in the system 100 of FIG. 1, it should be appreciated that the system 100 can accommodate multiple different consumers Likewise, while one merchant 114 is shown in the system 100 of FIG. 1, it should be appreciated that any number of merchants may be included, and accommodated by the system 100. Further, while a single acquirer 106 is shown in the system 100 associated with both the value transfer provider 102 and the merchant 114, it should be appreciated that any number of acquirers may be included in the system 100 (e.g., one acquirer associated with the value transfer provider 102 and another acquirer associated with the merchant 114, etc.).

Figure 2:
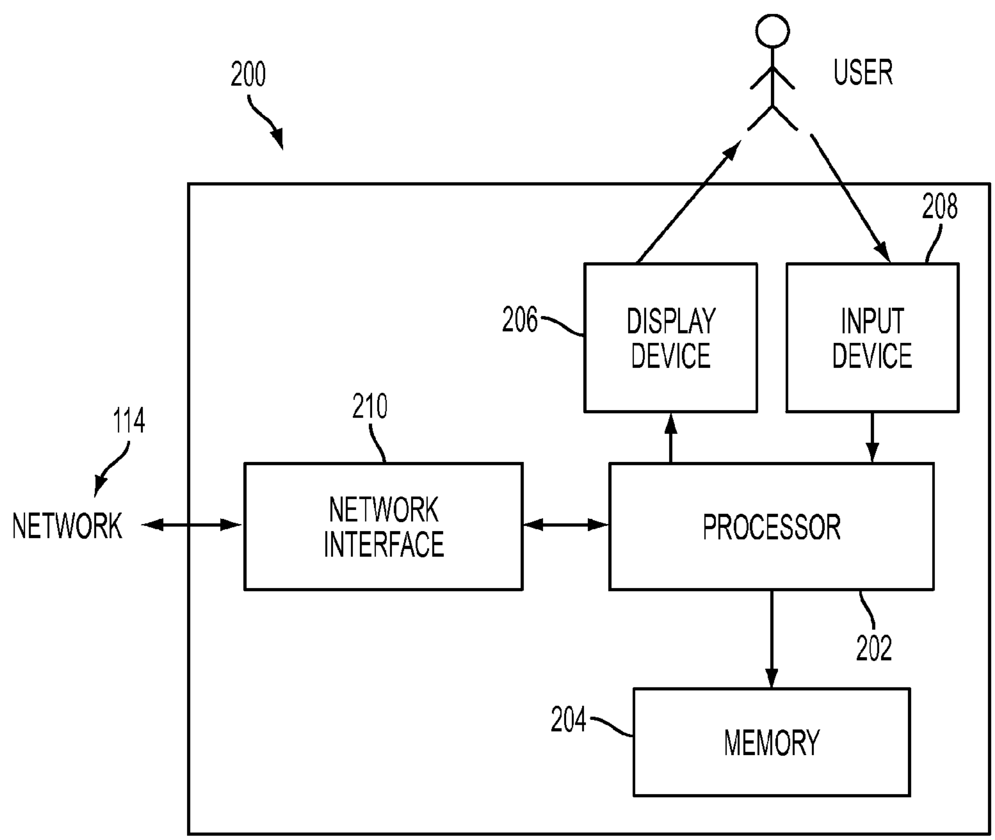
FIG. 2 is a block diagram of a computing device, that may be used in the exemplary system of FIG. 1.

FIG. 2 illustrates an exemplary computing device 200. In the exemplary embodiment of FIG. 1, each of the value transfer provider 102, the voucher provider 104, the acquirer 106, the payment network 108, the issuer 110, the conversion engine 112, and the merchant 114 are illustrated as including or being associated with a computing device 200. In addition, it should also be appreciated that, while not illustrated, the mobile device 120 of the consumer 118 may be associated with a computing device 200. With that said, the computing device 200 may include, for example, one or more servers, personal computers, laptops, tablets, PDAs, telephones (e.g., cellular phones, smartphones, other phones, etc.), POS terminals, etc. as appropriate.

The system 100, and its components, however, should not be considered to be limited to the computing device 200, as described below, as different computing devices and/or arrangements of computing devices may be used. In addition, different components and/or arrangements of components may be used in other computing devices. Further, in various exemplary embodiments the computing device 200 may include multiple computing devices located in close proximity, or distributed over a geographic region. Additionally, each computing device 200 may be coupled to a network (e.g., the Internet, an intranet, a private or public LAN, WAN, mobile network, telecommunication networks, combinations thereof, or other suitable network, etc.) that is either part of the network 116, or separate therefrom.

The exemplary computing device 200 includes a processor 202 and a memory 204 that is coupled to the processor 202. The processor 202 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and thus are not intended to limit in any way the definition and/or meaning of processor.

The memory 204, as described herein, is one or more devices that enable information, such as executable instructions and/or other data, to be stored and retrieved. The memory 204 may include one or more computer-readable media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, flash drives, hard disks, and/or any other type of volatile or nonvolatile physical or tangible computer-readable media. The memory 204 may be configured to store, without limitation, voucher data (e.g., account data for the voucher provider 104, VIDs for vouchers issued by the voucher provider 104, voucher values for the issued vouchers, etc.), directory numbers for mobile devices, payment account data for consumers, data structures of directory number-payment account number conversion tables, payment transaction data, data for voucher providers, and/or other types of data suitable for use as described herein, etc. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer-readable media. It should be appreciated that the memory 204 may include a variety of different memories, each implemented in one or more of the functions or processes described herein.

In the exemplary embodiment, the computing device 200 includes a display device 206 that is coupled to the processor 202 (however, it should be appreciated that the computing device could include other output devices, etc.). The display device 206 outputs to a user (e.g., the consumer 118, individuals associated with the value transfer provider 102, individuals associated with the voucher provider 104, individuals associated with the acquirer 106, individuals associated with the payment network 108, individuals associated with the issuer 110, individuals associated with the merchant 114, etc.) by, for example, displaying and/or otherwise outputting information such as, but not limited to, voucher data (e.g., account data for the voucher provider 104, VIDs for vouchers issued by the voucher provider 104, voucher values for the issued vouchers, etc.), mobile device directory numbers, payment account data for consumers, directory number-payment account number conversion tables, payment transaction data, and/or any other type of data. It should be further appreciated that various interfaces (e.g., webpages, etc.) may be displayed at computing device 200, and in particular at display device 206, to display such information, etc. And in some cases, the computing device 200 may cause the interfaces to be displayed at the display device 206 of another computing device, including, for example, a server hosting a website (e.g., the website associated with the value transfer provider 102, the conversion engine 112, etc.) having multiple webpages, etc. Display device 206 may include, without limitation, a cathode ray tube (CRT), a liquid crystal display (LCD), a light-emitting diode (LED) display, an organic LED (OLED) display, and/or an "electronic ink" display. In some embodiments, display device 206 includes multiple devices.

The computing device 200 also includes an input device 208 that receives input from the user. The input device 208 is coupled to the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both display device 206 and input device 208.

In addition, the illustrated computing device 200 also includes a network interface 210 coupled to the processor 202 and the memory 204. The network interface 210 may include, without limitation, a wired network adapter, a wireless network adapter, a mobile telecommunications adapter, or other device capable of communicating to one or more different networks, including the network 116. In some exemplary embodiments, the computing device 200 includes the processor 202 and one or more network interfaces incorporated into or with the processor 202.

Figure 3:
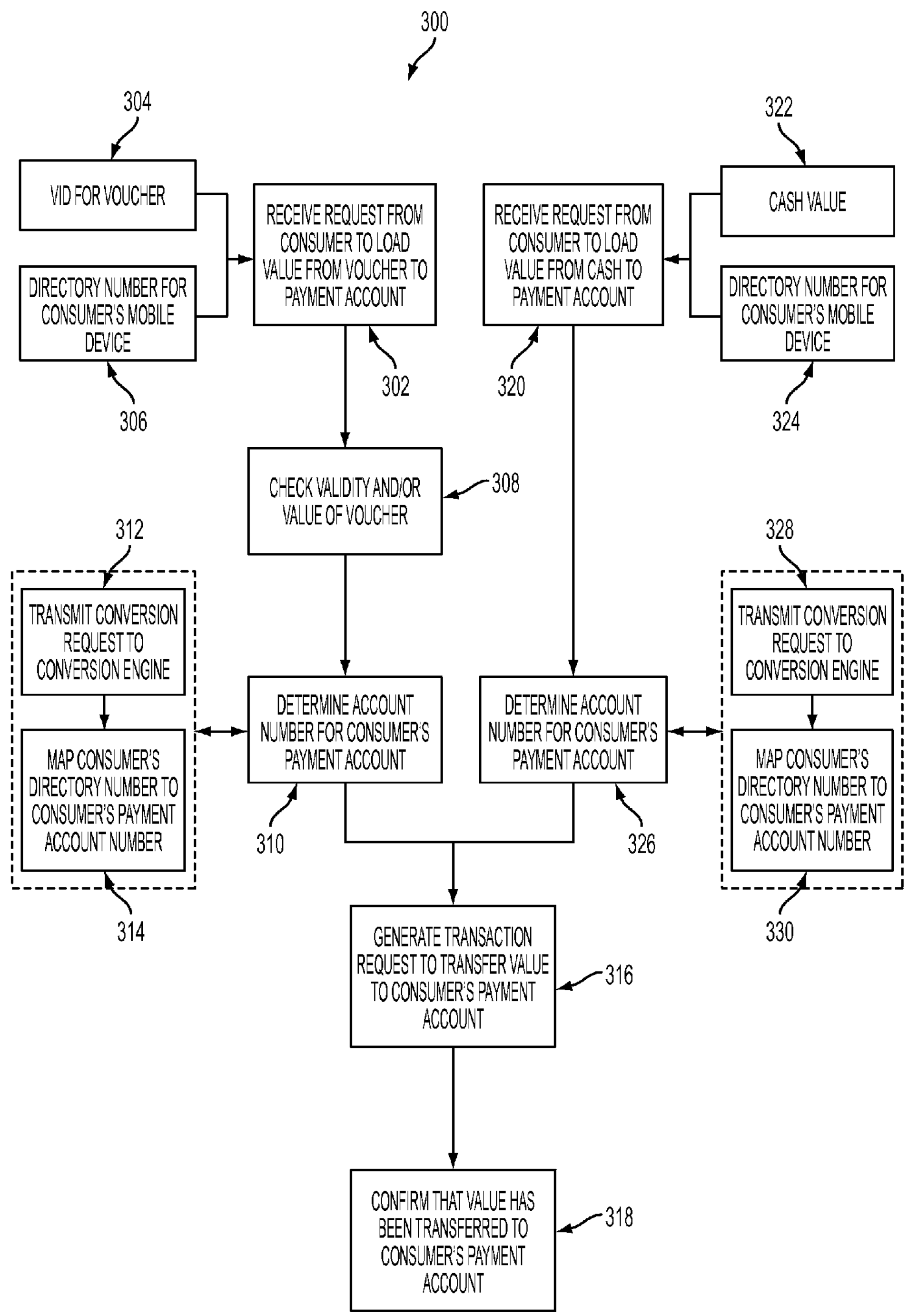
FIG. 3 is an exemplary method, suitable for use with the system of FIG. 1, for transferring value to the payment account.

FIG. 3 illustrates an exemplary method at 300 for transferring value to a payment account associated with the consumer 118. The exemplary method 300 is described as implemented in the value transfer provider 102 of the system 100, with further reference to the voucher provider 104, the acquirer 106, the payment network 108, the issuer 110, the conversion engine 112, the merchant 114, and the consumer 118 (and the interactions there between). In at least some embodiments, it is contemplated that the value transfer provider 102 may be included with (or implemented by) the payment network 108 or the acquirer 106, or with other entities shown or not shown in FIG. 1. In addition, in at least some embodiments, it is contemplated that the conversion engine 112 may be included with (or implemented by) the value transfer provider 102, or the payment network 108, or the acquirer 106 (as indicated by the broken lines in FIG. 1), or with other entities shown or not shown in FIG. 1.

Further, for purposes of illustration, the exemplary method 300 is described herein with reference to the computing device 200. And, just as the methods herein should not be understood to be limited to the exemplary system 100, or the exemplary computing device 200, the systems and the computing devices herein should not be understood to be limited to the exemplary method 300.

In one implementation of the method 300, when desired to provide value to the payment account associated with the consumer's virtual wallet (e.g., load, reload, etc. the payment account), the consumer 118 purchases a voucher from the merchant 114 with a desired value to be placed in the payment account. As part of the purchase transaction, the merchant 114 collects funds (e.g. cash, etc.) from the consumer 118 corresponding to the value of the voucher. In addition, the merchant 114 communicates a VID for the voucher and a value of the voucher to the voucher provider 104, via the network 116. Using this data, the voucher provider 104 activates the voucher in the desired value and communicates, via the network 116, an activation confirmation back to the merchant 114. The voucher provider 104 also stores data for the activated voucher in the memory 204 of the computing device 200 associated therewith for subsequent use/verification. The merchant 114 then provides a voucher activation receipt to the consumer 118 indicating the VID and the voucher value.

As shown in FIG. 3, to transfer the value of the voucher to the payment account associated with the virtual wallet (in total or in part), the consumer 118 submits a load request to the value transfer provider 102, via the network 116, for a load transaction, and the value transfer provider 102 receives the request at the computing device 200 at 302. In connection with the request, the value transfer provider 102 causes (e.g., the processor 202 of the computing device 200 of the value transfer provider 102 causes, etc.) an interface to display at the consumer's computing device 200 for use in collecting data for the transaction. In so doing, the value transfer provider 102 receives from the consumer 118, either together (e.g., in the single request, etc.) or individually (e.g., in multiple separate requests, etc.), the VID at 304 and the directory number for the consumer's mobile device 120 at 306.

After receiving the load request from the consumer 118, at 302, the value transfer provider 102 performs a check of the validity and/or a check of the value of the voucher at 308, before further processing the request. In so doing, the value transfer provider 102 communicates data relating to the voucher, i.e., the VID, as received from the consumer 118, to the voucher provider 104, via the network 116, for verification. If the voucher data is valid, the voucher provider 104 communicates a confirmation back to the value transfer provider 102 that the voucher is valid. Alternatively, if the voucher data is invalid (e.g., if the VID is invalid, if the voucher value valid is invalid, etc.), the voucher provider 104 then communicates a warning back to the value transfer provider 102.

Also after receiving the request from the consumer 118, the value transfer provider 102 determines the account number for the consumer's payment account at 310. In this implementation of the method 300, this includes transmitting (or submitting) a conversion request, at 312, to the conversion engine 112, via the network 116, for the account number. The conversion request includes the consumer's directory number, as received by the value transfer provider 102 at 306. In response, the conversion engine 112 searches in the data structure 122 for the directory number, and then maps (or correlates), at 314, the directory number to the consumer's account number (e.g., via conversion tables, etc.). If the consumer's directory number is found in the data structure 122, the conversion engine 112 communicates the corresponding account number back to the value transfer provider 102, via the network 116. However, if the consumer's directory number is not found in the data structure 122, the conversion engine 112 then communicates a failure notice to the value transfer provider 102.

Next, the value transfer provider 102 generates a transaction request at 316 and communicates it, via the network 116, to the acquirer 106 for the value to be added to the consumer's payment account. The transaction request includes the account number for the consumer's payment account, as received from the conversion engine 112 at 314, and the value to be transferred to the payment account. In turn, the acquirer 106 then communicates the transaction request through the payment network 108 to the issuer 110. The issuer 110 then processes the payment request and, if valid (e.g., if the VID and the voucher value match data generated by the voucher provider 104 when the voucher was purchased, etc.), approves the request and transfers the voucher value to the consumer's payment account. Following the transfer, the issuer 110 communicates an authorization response, containing the updated value balance of the payment account, back to the value transfer provider 102 (again through the payment network 108 and the acquirer 106). And, the value transfer provider 102 then confirms to the consumer 118, at 318, that the voucher value has been transferred to the consumer's payment account. The consumer's mobile wallet can then be used in connection with a payment transaction, for example, at the merchant 114 as described above in connection with the system 100.

In another implementation of the method 300, the consumer 118 contacts the merchant 114 (e.g., in person) with a load request to provide value to his/her account using cash. The merchant 114 collects the desired value, from the consumer 118, to be provided to the payment account, in the form of a cash payment, and enters the value into the POS terminal. The merchant 114 also enters the directory number for the consumer's mobile device 120 into the POS terminal, for use in identifying the consumer's payment account. The merchant 114 communicates, via the POS terminal, the load request to the acquirer 106, via the network 116, for the value to be loaded. And, the acquirer 106 then transmits the load request to the value transfer provider 102.

As shown in FIG. 3, the value transfer provider 102 receives the load request from the acquirer 106 at the computing device 200 at 320 (e.g., via the API associated with the value transfer provider 102, etc.). The load request includes the value to be transferred to the consumer's payment account at 322 and the consumer's directory number at 324 (as received from the consumer 118). The value transfer provider 102 then determines the account number for the consumer's payment account at 326, based on the directory number in the load request. As previously described, this includes transmitting (or submitting) a conversion request, at 328, to the conversion engine 112, via the network 116, for the account number. The conversion request includes the consumer's directory number, as received by the value transfer provider 102 (from the acquirer 106) at 324. In response, the conversion engine 112 searches in the data structure 122 for the directory number, and then maps (or correlates), at 330, the directory number to the consumer's account number (e.g., via the conversion tables, etc.). If the consumer's directory number is found in the data structure 122, the conversion engine 112 communicates the corresponding account number back to the value transfer provider 102, via the network 116. However, if the consumer's directory number is not found in the data structure 122, the conversion engine 112 then communicates a failure notice to the value transfer provider 102.

Next, the value transfer provider 102 generates a transaction request at 316, and communicates it, via the network 116, to the payment network 108 (e.g., through the acquirer 106, etc.) for the value to be added to the consumer's payment account. The transaction request includes the account number for the consumer's payment account, as received from the conversion engine 112 at 330, and the value to be transferred to the payment account. In turn, the payment network 108 communicates the transaction request to the issuer 110. The issuer 110 then processes the transaction request and, if valid, approves the request and transfers the value to the consumer's payment account. Following the transfer, the issuer 110 communicates an authorization response, containing the updated value balance of the payment account, back through the payment network 108 and the acquirer 106. The authorization response may then be transmitted to the value transfer provider 102, who then confirms to the consumer 118, at 318, that the voucher value has been transferred to the consumer's payment account (e.g., via an interface displayed at a computing device 200 associated with the consumer 118, etc.). Or, the authorization response may be transmitted to the merchant 114, who then confirms to the consumer 118, at 318, that the value has been transferred to the consumer's payment account. In either case, the consumer's mobile wallet can then be used in connection with a payment transaction, for example, at the merchant 114 as described above in connection with the system 100.

With continued reference to FIG. 3, in a further implementation of the method 300, the consumer 118 again contacts the merchant 114 (e.g., in person) with a load request to provide value to his/her account using cash. The merchant 114 collects the desired value, from the consumer 118, to be provided to the payment account, in the form of a cash payment, and enters the value into the POS terminal. The merchant 114 also enters the directory number for the consumer's mobile device 120 into the POS terminal, for use in identifying the consumer's payment account. The merchant 114 then communicates, via the POS terminal, the load request to the acquirer 106 (as part of 320), via the network 116, for the value to be loaded. The load request includes the value to be loaded to the consumer's payment account at 322 and the consumer's directory number at 324.

In this implementation, as part of determining the account number for the consumer's payment account at 326, the acquirer 106 transmits a conversion request, at 328, to the conversion engine 112, via the network 116, for the account number of the consumer's payment account. The conversion request includes the consumer's directory number, as received by the acquirer 106 at 324. In response, the conversion engine 112 searches in the data structure 122 for the directory number, and then maps (or correlates), at 330, the directory number to the consumer's account number (e.g., via the conversion tables, etc.). If the consumer's directory number is found in the data structure 122, the conversion engine 112 communicates the corresponding account number back to the acquirer 106, via the network 116. However, if the consumer's directory number is not found in the data structure 122, the conversion engine 112 then communicates a failure notice to the acquirer 106. Assuming a failure notice is not received, the acquirer 106 may then transmit the load request to the merchant 114, via the network 116, now including the account number for the consumer's payment account and the value to be transferred to the account. And, the merchant 114 receives the request at the computing device 200, and may then transmit a corresponding transaction request (e.g., at 316 in method 300, etc.) to the acquirer 106 (and the process continues as described next). Or, the acquirer 106 may simply generate a transaction request at 316, upon receiving the account number for the consumer's payment account, and transmit the transaction request to the payment network 108 as described next (and in lieu of transmitting the load request, with the consumer's converted account number, to the merchant 114).

As generally described in the previous implementations of the method 300, the acquirer 106 generates (or, in some exemplary embodiments, forwards from the merchant 114) a transaction request at 316, and communicates the transaction request, via the network 116, to the payment network 108 for the value to be added to the consumer's payment account (e.g., through the value transfer provider 102, etc.). The transaction request includes the account number for the consumer's payment account, as received from the conversion engine 112 at 330, and the value to be transferred to the payment account. In turn, the payment network 108 communicates the transaction request to the issuer 110. The issuer 110 then processes the transaction request and, if valid, approves the request and transfers the value to the consumer's payment account. Following the transfer, the issuer 110 communicates an authorization response, containing the updated value balance of the payment account, back to the merchant 114 (again through the payment network 108 and the acquirer 106). And, the merchant 114 then confirms to the consumer 118, at 318, that the value has been transferred to the consumer's payment account. The consumer's mobile wallet can then be used in connection with a payment transaction, for example, at the merchant 114 as described above in connection with the system 100.

In some embodiments, the computing device 200 associated with the consumer 118 includes a mobile computing device with an application for transferring value to the payment account associated with the consumer 118 (e.g., in accordance with the system 100, the method 300, etc.). For example, the memory 204 of the computing device 200, and specifically, the non-transitory computer readable media, includes computer-executable instructions that when executed by the processor 202 cause the processor 202 to transfer the value to the consumer's payment account. For example, using the application, which may communicate with the computing device 200 of the value transfer provider 102 via any available communication type (e.g., email, text message, etc.), the consumer 118 may request the transfer, view transfer confirmations, and view balance details of the payment account.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) receiving a load request to transfer value to a payment account associated with a consumer, the load request including the value to be transferred and a directory number for a mobile device associated with the consumer; (b) when the value to be transferred is associated with a voucher, confirming validity of the voucher; (c) determining an account number for the consumer's payment account, at the computing device, based on the directory number for the consumer's mobile device; (d) generating a transaction request indicating the value to transfer to the payment account and the account number for the consumer's payment account; and (e) receiving a transfer authorization from an acquirer or issuer in response to the transaction request.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," or "included with" another element or layer, it may be directly on, engaged, connected or coupled to, or associated with the other element or layer, or intervening elements or layers may be present. As used herein, the term "and/or" includes any and all combinations of one or more of the associated listed items.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of transferring value to a payment account associated with a consumer, the method comprising:

receiving, at a computing device, a load request from a consumer to transfer value to a payment account associated with the consumer, the value to be transferred associated with a voucher, and the load request including the value to be transferred and a directory number for a mobile device associated with the consumer;

determining an account number for the consumer's payment account, at the computing device, based on the directory number for the consumer's mobile device;

generating, by the computing device, a request indicating the value to transfer to the payment account and the account number for the consumer's payment account, whereby the value associated with the voucher can be transferred by the consumer to the consumer's payment account; and communicating, to an acquirer, said request indicating the value to transfer to the payment account, whereby said request is then communicated to an issuer associated with the payment account.

2. The method of claim 1, wherein determining an account number includes transmitting a conversion request to a conversion engine, the conversion request including the directory number; and receiving, in response to the conversion request, the account number mapped to the directory number from the conversion engine.

3. The method of claim 1, wherein the load request further includes an identification number for the voucher.

4. The method of claim 3, further comprising confirming validity of the voucher, by the computing device, prior to determining an account number for the consumer's payment account.

5. The method of claim 1 further comprising receiving a transfer authorization response from the issuer, via the acquirer, at the computing device, in response to the request.

6. The method of claim 1, wherein the directory number for the consumer's mobile device includes a telephone number to the mobile device.

7. A system for transferring value to a payment account associated with a consumer via a payment network, the system comprising:

a payment network; and a computing device coupled to the payment network, the computing device comprising a memory configured to store data relating to consumer payment accounts and a processor coupled to the memory, the processor configured to:

receive a request to transfer value to a payment account associated with a consumer, from an acquirer associated with a merchant at which the request was initiated, the request including the value to be transferred to the consumer's payment account and a directory number for a mobile device associated with the consumer;

correlate an account number for the consumer's payment account with the directory number for the consumer's mobile device;

generate a transaction request indicating the value to transfer to the consumer's payment account and the account number for the consumer's payment account; and confirm that the transfer is complete, in response to a transfer authorization approving the transaction request.

8. The system of claim 7, wherein the processor is further configured to cause an interface to display for receiving the value to be transferred to the consumer's payment account and the directory number for the consumer's mobile device from the consumer as part of the request.

9. The system of claim 7, wherein the payment account is associated with a virtual pre-paid wallet.

10. The system of claim 7, wherein the memory comprises a data structure configured to store directory numbers for mobile devices for multiple different consumers together with account numbers for payment accounts for the multiple different consumers, each account number associated with a directory number.

11. The system of claim 7, wherein the directory number for the consumer's mobile device includes a telephone number to the mobile device.

12. The system of claim 7, wherein the request is received from the consumer.

13. The system of claim 7, wherein the request to transfer value to the payment account includes a request to transfer value from a voucher to the payment account.

14. A non-transitory computer readable media comprising instructions for transferring value, by a consumer, to a payment account of the consumer associated with a virtual pre-paid wallet that, when executed by at least one processor, cause the at least one processor to:

in response to a load request by a consumer to transfer value to a payment account of the consumer associated with a virtual pre-paid wallet, submit a directory number for a mobile device associated with the consumer to a conversion engine, whereby the directory number is mapped to an account number for the consumer's payment account;

communicate a transaction request, to a payment network, to transfer at least part of the value to the consumer's payment account, the transaction request including the at least part of the value to be transferred to the consumer's payment account and the account number for the consumer's payment account; and confirm that the transfer is complete, in response to a transfer authorization approving the transaction request.

15. The non-transitory computer readable media of claim 14, wherein the instructions further define the conversion engine such that, when the instructions are executed, the conversion engine maps the directory number for the consumer's mobile device to the account number for the consumer's payment account.

16. The non-transitory computer readable media of claim 14, wherein the value to be transferred to the consumer's payment account is associated with a voucher.

17. The non-transitory computer readable media of claim 16, wherein the transaction request to transfer at least part of the value to the payment account is communicated to an acquirer; and further comprising instructions that, when executed by at least one processor, cause the at least one processor to receive the transfer authorization from the acquirer in response to the transaction request.

18. The non-transitory computer readable media of claim 14, wherein the value to be transferred to the consumer's payment account includes cash value.

19. The non-transitory computer readable media of claim 18, wherein the transaction request to transfer at least part of the value to the payment account is communicated to an issuer associated with the consumer's payment account; and further comprising instructions that, when executed by at least one processor, cause the at least one processor to receive the transfer authorization from the issuer in response to the transaction request.

* * * * *